Patented Aug. 18, 1953

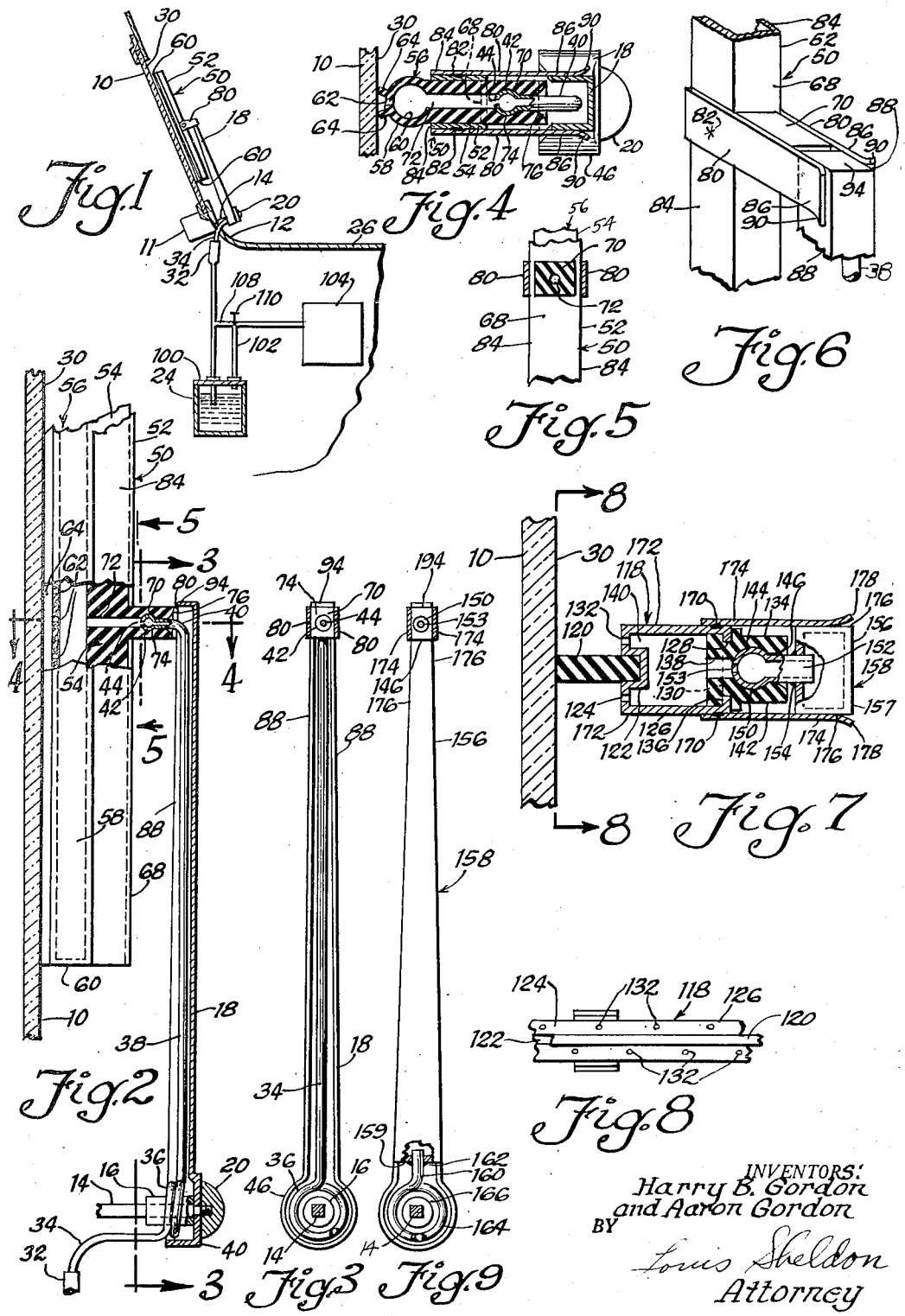

2,648,865

UNITED STATES PATENT OFFICE 2,648,865

WINDSHIELD WIPER

Harry B. Gordon, Glenview, and Aaron Gordon, Chicago, Ill.

Application May 15, 1946, Serial No. 669,901

4 Claims. (Cl. 15—250.4)

Our invention relates to windshield wipers.

An object of our invention is to provide a windshield wiper adapted to discharge fluid against the windshield in advance of the squeegee, for cleaning the windshield of mud, preventing icing, etc.

Another object is to provide a windshield wiper blade structure which is readily attachable to and detachable from the operating arm. A further object is to provide a windshield wiper blade structure which is readily attachable to and detachable from the wiper arm and, when attached, has a fluid-tight connection therewith.

An additional object is to provide a windshield wiper arm structure adapted to be supplied with fluid while moving to and fro across the windshield and at the same time to discharge such fluid onto the windshield.

Further objects and advantages of our invention will appear as the description proceeds.

The invention will be better understood upon reference to the following description and accompanying drawing, in which;

Fig. 1 is a vertical view, partly in section and partly in elevation, showing an illustrative form of installation of a windshield wiper system in accordance with one form of our invention.

Fig. 2 is an enlarged fragmentary sectional view showing details of the wiper construction.

Figs. 3, 4 and 5 are sectional views taken as indicated by the lines 3—3, 4—4 and 5—5, respectively, in Fig. 2.

Fig. 6 is a fragmentary isometric view showing further details.

Fig. 7 is a view similar to Fig. 4, but of a modification.

Fig. 8 is a fragmentary elevational view taken as indicated by the line 8—8 in Fig. 7.

Fig. 9 is a view similar to Fig. 3 but shows a modified wiper arm, of which a part appears in Fig. 7.

Referring now more particularly to the drawing, there is shown at 10 a windshield such as that carried by an automotive or other vehicle, with a vacuum, electric or other suitable motor 11 suitably mounted as on the cowl 12 and having a shaft 14 extended through the cowl and into the hub 16 of a wiper arm 18, where it is secured as by a nut 20. The shaft 14 is preferably flexible or flexibly mounted and arranged to urge the wiper arm 18 toward the windshield and allow the wiper arm to be swung away from the windshield. A container 24 which may be mounted at any suitable point, as for example within the hood 26, may contain water, glycerine or any other suitable windshield treating liquid 28, which one may desire to have applied to the windshield surface 30 for cleaning off mud, preventing icing and any other purpose. A tube 32 immersed in the liquid 28 is extended through a grommet in a hole 33 in the cowl 12 and has connected thereto a copper or other suitable thin tube 34 which is coiled as at 36 about the hub 16 and extends from the coiled portion longitudinally as shown at 38 along and preferably within the confines of the arm 18, which is preferably substantially channel shaped substantially throughout its length. The portion 38 of the tube 34 terminates in a goose neck 40 whose free end is substantially ball shaped as shown at 42, with a discharge opening 44. The lower end of the arm 18 may be substantially circular as shown at 46 and affords protection for the coiled portion 36 of the tube 34. The motor 11 causes oscillation of the arm 18, and the tube 34 is of such resilience that the coil portion 36 is able to withstand the torsional stresses applied thereto by such oscillation.

Further in accordance with one form of our invention there is provided a wiper body or unit 50 comprising a channel shaped backing member or holder 52 in which the base 54 of a resilient rubber or like squeegee element 56 is securely mounted. The element 56 beyond the holder 52 is preferably tubular as shown at 58 and is preferably closed at its ends 60 but is provided with a longitudinal series of relatively fine discharge ports 62 between a pair of wiping blades or vanes 64, or manifestly the ports could be arranged on one or opposite sides of a single wiping blade, as will appear.

Projecting from the base 54 of the squeegee element 56 and through the web 68 of the holder 52 is a boss 70, a passage 72 extending through the base and boss, the portion of said passage within the boss having a spherical enlargement 74 of a size to embrace the ball 42 with a universally adjustable yet liquid-tight and air-tight fit. The outer end of the passage 72 is flared as at 76 to facilitate introduction of the ball 42, and the passage is of sufficient size in relation to the ball 42, and the rubber or like material of the boss 70 is of such elasticity, that the ball can be readily forced into and removed from the socket 74, and when the ball is in the socket it is tightly held, yet the squeegee unit 50 has the freedom of movement needed under operating conditions.

For the purpose of holding the squeegee unit 50 in substantial alinement with the wiper arm 18, we may employ leaf springs 80 riveted or welded as at 82 preferably to the flanges 84 of the channel holder 52 and extending at opposite sides of and beyond the boss 70 and having their free end portions 86 disposed to resiliently straddle the flanges 88 of the wiper arm, the terminals of said end portions being preferably flared as at 90 to facilitate entrance of the wiper arm between the springs as the ball 42 is about to be inserted into the socket 74. It will be observed that the wiper arm 18 has an overhanging end wall 94 which closes the upper end of the channel of the wiper arm and cooperates with the channel in protecting the goose neck portion 40 of the tube 34.

To place the liquid 28 under pressure, we may connect to the upper part 100 of the container 24 a conduit 102 connected to a suitable supply of hot or other air or other gas under pressure, such as may be available in the exhaust manifold of the engine, or a compressed air reservoir or the like, such source being diagrammatically shown as at 104.

It may be desired to supply air or other gas instead of the liquid 28 to the squeegee unit 50. To this end we provide a conduit 108 between the conduits 32 and 102, and, at the juncture of the conduits 102 and 108, provide a three-way valve 110. When the valve 110 is operated to block passage of the gas to the conduit 102, the gas bypasses the container and, via the conduits 108 and 32, enters the squeegee unit 50 and is discharged through the ports 62. When the valve 110 is operated to block passage of the gas to the conduit 108, the gas places the liquid 28 under pressure, forcing the liquid through the conduit 32 to be discharged through the ports 62. When the valve 110 is operated to its third adjustment, it blocks escape of gas from the source 104, and then the wiper is operative in the conventional manner, i. e., without fluid.

A modified squeegee unit 118 is shown in Figs. 7 and 8 cooperating with a modified wiper arm shown in Figs. 7 and 9. Here we employ a rubber or other suitable preferably elastic vane or blade 120 wedged or otherwise suitably secured as in a groove or depression 122 in the wall 124 of a tubular backing member or holder 126, which is completely closed except for a hole 128, which may be round, in the opposite wall 130 and a series of discharge ports 132 in the wall 124 at each side of the depression 122, the series at one side being preferably staggered relative to the series at the other side. The hole 128 is disposed preferably substantially midway of the length of the holder 126, or elsewhere, as desired. An elastic rubber or other suitable nipple or grommet 134, having an external annular groove 136, is forced into the hole 128 so that the groove receives the portion of the wall 130 defining the hole with a liquid-tight and air-tight fit. The nipple 134 has a bore or passage 138 communicating with the interior 140 of the tube 126 and, in the portion 142 of the nipple extending free of the tube, has a preferably spherical socket enlargement 144 and a flared outer end 146 for admitting and embracing, with a liquid-tight and air-tight fit, a hollow ball 150 formed on the free end of a metal or other preferably stiff copper or other tube 152 and having a discharge port 153. The tube 152 is preferably soldered as at 154 or otherwise hermetically secured to the operating end 155 of a tube 156 formed as part of a wiper arm 158. To the lower end 159 of the tube 156 a conduit 160 is soldered as at 162 or otherwise hermetically secured. The conduit 160 may be of the same material as the tube 34 and coiled as at 164 about the hub 166 of the arm 158 for the same purpose.

Welded to the tube 156 as at 170 or otherwise suitably secured to the side walls 172 or other parts of the tube 126 are leaf springs 174 or the like adapted to straddle and press against the flanges 88 of the wiper arm 18 or the side walls 176 of the wiper arm 158, the springs having flared terminals 178 to facilitate entry of the wiper arm therebetween.

With either form of the invention the wiper arm can be readily inserted between and removed from between the springs, and the ball 42 or 150 can be readily inserted into and removed from the socket provided therefor, so that if for any reason either squeegee unit should require removal for inspection, repair or replacement, removal can be effected by the simple expedient of pulling the squeegee unit from the wiper arm, and, likewise, assembly can be effected by the simple expedient of forcing them together.

Various modifications coming within the spirit of our invention may suggest themselves to those skilled in the art, and hence we do not wish to be limited to the specific forms shown or uses mentioned, except to the extent indicated in the appended claims, which are to be interpreted as broadly as the state of the art will permit.

We claim:

1. A windshield wiper construction, comprising a supply of air under pressure, a container having a windshield-treating liquid therein, a substantially channel-shaped windshield wiper arm, means including a rock shaft for oscillatably mounting said arm at the weather side of a windshield, a hollow squeegee unit having ports directed toward the windshield, a conduit extending from said liquid to said squeegee unit, said conduit including a resilient metal tube coiled about said shaft and torsionally yieldable in response to oscillation of said arm and extending beyond the coiled portion along and within said arm, said tube having a goose neck adjacent the free end of said arm, said neck terminating in a hollow spherical end having a discharge opening, said squeegee unit including a yieldable wiping element having a ball socket expansible and contractible to releasably admit and embrace said ball with a substantially liquid-tight and air-tight fit, said arm having a part shielding the upper side of said gooseneck, cooperating means on said unit and arm for holding them in predetermined relation, and means for selectively connecting said air supply to said container or to said conduit, whereby said air may force said liquid to said squeegee unit or said air may pass directly to said squeegee unit, as desired.

2. In a windshield wiper assembly of the type wherein fluid is directed from a squeegee unit against the windshield, a conduit having a section of stiff tubing with a goose neck terminating in a hollow ball integral with said goose neck and having a discharge port, a wiper arm having a longitudinal channel in which said section is received for movement in unison with said arm, and a hollow squeegee unit having discharge ports therealong and a branch inlet passage including a ball socket coupled with said ball, said unit having spring guide means straddling and substantially engaging said arm for yieldably holding said unit in predetermined relation to said arm.

3. In a windshield wiper assembly of the type wherein fluid is directed from a squeegee unit against the windshield, a conduit having a section of stiff tubing terminating in a hollow ball integral with said tubing and having a discharge port, a wiper arm having a longitudinal channel in which said section is received for movement in unison with said arm, and a hollow squeegee unit having discharge ports therealong and a branch inlet passage including a ball socket coupled with said ball, said unit having spring-pressed means straddling and substantially engaging said arm for yieldably holding said unit in predetermined relation to said arm.

4. A windshield wiper arm having a tubular portion throughout a substantial part of its length, a hollow ball communicating with an end of said tubular portion and having a discharge port, and a tube communicating with the other end of said tubular portion for conducting fluid to said tubular portion, said arm having a hub adapted to be oscillatably coupled to a motor, said tubular portion being coiled about said hub and being flexible to yield pursuant to oscillation of said arm.

HARRY B. GORDON.
AARON GORDON.

References Cited in the file of this patent

UNITED STATES PATENTS

| Number | Name | Date |
|---|---|---|
| 755,521 | Mortimer | Mar. 22, 1904 |
| 1,279,444 | Robertson | Sept. 17, 1918 |
| 1,719,006 | Fogland | July 2, 1929 |
| 1,745,246 | Colley | Jan. 28, 1930 |
| 2,069,699 | Dohler | Feb. 2, 1937 |
| 2,091,928 | Horton | Aug. 31, 1937 |
| 2,168,202 | Grantham | Aug. 1, 1939 |
| 2,173,021 | Longwell | Sept. 12, 1939 |
| 2,318,529 | Sailer | May 4, 1943 |
| 2,348,502 | Smulski | May 9, 1944 |